United States Patent
MacNaughtan et al.

(10) Patent No.: US 8,359,044 B2
(45) Date of Patent: Jan. 22, 2013

(54) ENHANCED MOBILE LOCATION METHOD AND SYSTEM

(75) Inventors: Malcolm MacNaughtan, Pymble (AU); Christopher Ridgway Drane, Pymble (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 713 days.

(21) Appl. No.: 11/886,528

(22) PCT Filed: Mar. 20, 2006

(86) PCT No.: PCT/AU2006/000347

§ 371 (c)(1),
(2), (4) Date: Mar. 9, 2009

(87) PCT Pub. No.: WO2006/096922

PCT Pub. Date: Sep. 21, 2006

(65) Prior Publication Data

US 2009/0215465 A1    Aug. 27, 2009

(30) Foreign Application Priority Data

Mar. 18, 2005  (AU) .................................. 2005901353

(51) Int. Cl.
*H04W 24/00*   (2009.01)

(52) U.S. Cl. .................... 455/456.1; 455/423; 455/456.6
(58) Field of Classification Search ............... 455/456.1, 455/423, 456.6

See application file for complete search history.

(56) References Cited

U.S. PATENT DOCUMENTS

| | | | |
|---|---|---|---|
| 5,045,861 A | 9/1991 | Duffett-Smith et al. | |
| 5,524,136 A * | 6/1996 | Bar-Noy et al. | 455/456.1 |
| 5,564,079 A | 10/1996 | Olsson | |
| 5,666,651 A * | 9/1997 | Wang | 455/512 |
| 5,950,125 A | 9/1999 | Buhrmann et al. | |
| 5,969,679 A | 10/1999 | Bolliger | |
| 5,999,126 A | 12/1999 | Ito | |
| 6,041,236 A | 3/2000 | Bernardin et al. | |
| 6,052,064 A | 4/2000 | Budnik et al. | |
| 6,061,021 A | 5/2000 | Zibell | |
| 6,073,089 A | 6/2000 | Baker et al. | |
| 6,088,598 A | 7/2000 | Marsolais | |
| 6,097,939 A | 8/2000 | Jacobs | |

(Continued)

FOREIGN PATENT DOCUMENTS

DE        29919376 U1    2/2000

(Continued)

OTHER PUBLICATIONS

International Search Report of PCT/AU2006/000347 dated Apr. 20, 2006.

(Continued)

*Primary Examiner* — Jinsong Hu
*Assistant Examiner* — Qun Shen
(74) *Attorney, Agent, or Firm* — Dovas Law, P.C.

(57) ABSTRACT

A method and system is disclosed for locating a mobile radio terminal in a radio communications network. The method makes use of additional positional constraints provided as a result of unreported cells. In one form of the invention, a likely reason for a particular cell not being reported is determined and an associated probability term is determined for use in a position location model. The invention also relates to a system for implementing the method.

7 Claims, 5 Drawing Sheets

U.S. PATENT DOCUMENTS

| | | |
|---|---|---|
| 6,104,344 A | 8/2000 | Wax et al. |
| 6,167,265 A | 12/2000 | Kim et al. |
| 6,201,499 B1 | 3/2001 | Hawkes et al. |
| 6,263,208 B1 | 7/2001 | Chang et al. |
| 6,266,534 B1 | 7/2001 | Raith et al. |
| 6,269,246 B1 | 7/2001 | Rao et al. |
| 6,330,600 B1 | 12/2001 | Matchefts et al. |
| 6,356,763 B1 | 3/2002 | Kangas et al. |
| 6,360,094 B1 | 3/2002 | Satarsinghe |
| 6,393,294 B1 | 5/2002 | Perez-Breva et al. |
| 6,411,819 B1 | 6/2002 | Gutowski |
| 6,449,257 B1 | 9/2002 | Choi |
| 6,449,486 B1 | 9/2002 | Rao |
| 6,496,701 B1 | 12/2002 | Chen et al. |
| 6,529,165 B1 | 3/2003 | Duffett-Smith et al. |
| 6,556,842 B1 | 4/2003 | Ericsson |
| 6,560,442 B1 | 5/2003 | Yost et al. |
| 6,567,381 B1 | 5/2003 | Jeon et al. |
| 6,591,116 B1 | 7/2003 | Laurila et al. |
| 6,631,262 B1 | 10/2003 | Wee |
| 6,711,404 B1 | 3/2004 | Arpee et al. |
| 6,728,539 B2 | 4/2004 | Kuwahara |
| 6,748,224 B1 | 6/2004 | Chen et al. |
| 6,782,265 B2 | 8/2004 | Perez-Breva et al. |
| 6,799,046 B1 | 9/2004 | Tang |
| 6,834,180 B1 | 12/2004 | Marshall |
| 6,856,805 B1 | 2/2005 | Raaf |
| 6,859,654 B1 | 2/2005 | Reynolds et al. |
| 6,947,734 B1 | 9/2005 | Toubassi |
| 6,947,835 B2 | 9/2005 | Kaplan et al. |
| 6,950,664 B2 | 9/2005 | Chen et al. |
| 6,961,587 B1 | 11/2005 | Vilppula et al. |
| 7,031,722 B2 | 4/2006 | Naghian |
| 7,096,115 B1 | 8/2006 | Groth et al. |
| 7,158,790 B1 | 1/2007 | Elliott |
| 7,233,800 B2 | 6/2007 | Laroia et al. |
| 7,289,763 B2 | 10/2007 | Dennison et al. |
| 7,505,433 B2 | 3/2009 | Yaqub et al. |
| 7,668,832 B2 | 2/2010 | Yeh et al. |
| 7,697,920 B1 | 4/2010 | McClain |
| 7,751,827 B2 | 7/2010 | Poykko et al. |
| 2001/0022558 A1 | 9/2001 | Karr et al. |
| 2002/0042268 A1 | 4/2002 | Cotanis |
| 2002/0042269 A1 | 4/2002 | Cotanis |
| 2002/0101834 A1 | 8/2002 | Stanley |
| 2002/0111772 A1 | 8/2002 | Skidmore et al. |
| 2002/0128019 A1 | 9/2002 | Ben-Yair et al. |
| 2002/0164997 A1 | 11/2002 | Parry |
| 2002/0168989 A1 | 11/2002 | Dooley et al. |
| 2002/0173275 A1 | 11/2002 | Coutant |
| 2002/0193150 A1 | 12/2002 | Pritchard |
| 2003/0008668 A1 | 1/2003 | Perez-Breva et al. |
| 2003/0032404 A1 | 2/2003 | Wager et al. |
| 2003/0040318 A1 | 2/2003 | Fattouche |
| 2003/0043941 A1 | 3/2003 | Johnson et al. |
| 2003/0060214 A1 | 3/2003 | Hendrey et al. |
| 2003/0078042 A1 | 4/2003 | Miriyala et al. |
| 2003/0078055 A1 | 4/2003 | Smith et al. |
| 2003/0109274 A1 | 6/2003 | Budka et al. |
| 2003/0119501 A1 | 6/2003 | Kim |
| 2003/0125031 A1 | 7/2003 | Sung Lim et al. |
| 2003/0147362 A1 | 8/2003 | Dick et al. |
| 2003/0148771 A1 | 8/2003 | de Verteuil |
| 2003/0186710 A1 | 10/2003 | Muhonen et al. |
| 2003/0208589 A1 | 11/2003 | Yamamoto |
| 2004/0018835 A1 | 1/2004 | Myers et al. |
| 2004/0037258 A1* | 2/2004 | Scherzer et al. .............. 370/338 |
| 2004/0116111 A1 | 6/2004 | Saunders |
| 2004/0132464 A1 | 7/2004 | Poykko et al. |
| 2004/0152470 A1 | 8/2004 | Spain |
| 2004/0157621 A1 | 8/2004 | Yamasaki et al. |
| 2004/0160365 A1 | 8/2004 | Riley et al. |
| 2004/0203717 A1 | 10/2004 | Wingrowicz |
| 2004/0203880 A1 | 10/2004 | Riley |
| 2004/0203885 A1 | 10/2004 | Quaid |
| 2004/0248589 A1 | 12/2004 | Gwon et al. |
| 2005/0012613 A1 | 1/2005 | Eckstein et al. |
| 2005/0040968 A1 | 2/2005 | Damarla et al. |
| 2005/0044564 A1 | 2/2005 | Stopniewicz et al. |
| 2005/0066325 A1 | 3/2005 | Mori et al. |
| 2005/0113117 A1 | 5/2005 | Bolin et al. |
| 2005/0134696 A1 | 6/2005 | Nath et al. |
| 2005/0136938 A1 | 6/2005 | Kang |
| 2005/0169183 A1 | 8/2005 | Lakkakorpi et al. |
| 2005/0192031 A1 | 9/2005 | Vare |
| 2005/0210342 A1 | 9/2005 | Schwagmann |
| 2005/0227683 A1 | 10/2005 | Draluk et al. |
| 2005/0239478 A1 | 10/2005 | Spirito |
| 2005/0282540 A1 | 12/2005 | Motamedi et al. |
| 2005/0282544 A1 | 12/2005 | Oommen et al. |
| 2005/0283540 A1 | 12/2005 | Fux et al. |
| 2006/0019665 A1* | 1/2006 | Aghvami et al. .............. 455/444 |
| 2006/0019679 A1 | 1/2006 | Rappaport et al. |
| 2006/0025068 A1 | 2/2006 | Regan et al. |
| 2006/0025158 A1 | 2/2006 | Leblanc et al. |
| 2006/0052057 A1 | 3/2006 | Perrson et al. |
| 2006/0064346 A1 | 3/2006 | Steenstra et al. |
| 2006/0087425 A1 | 4/2006 | Haeberlen et al. |
| 2006/0221901 A1 | 10/2006 | Yaqub et al. |
| 2006/0227045 A1 | 10/2006 | Sheynblat |
| 2006/0234701 A1 | 10/2006 | Wang et al. |
| 2006/0270421 A1 | 11/2006 | Phillips et al. |
| 2007/0001867 A1 | 1/2007 | Rowe et al. |
| 2007/0087764 A1 | 4/2007 | Buckley et al. |
| 2007/0121520 A1 | 5/2007 | Shrikhande et al. |
| 2007/0123268 A1 | 5/2007 | Parata |
| 2007/0208495 A1 | 9/2007 | Chapman et al. |
| 2007/0270168 A1 | 11/2007 | Sheynblat |
| 2007/0297346 A1 | 12/2007 | Huismann et al. |
| 2008/0004037 A1 | 1/2008 | Achlioptas et al. |
| 2008/0061967 A1 | 3/2008 | Corrado |
| 2009/0160939 A1 | 6/2009 | Fernandez et al. |
| 2009/0182630 A1 | 7/2009 | Otto et al. |
| 2010/0167725 A1 | 7/2010 | Noldus et al. |
| 2011/0244919 A1 | 10/2011 | Aller et al. |

FOREIGN PATENT DOCUMENTS

| | | |
|---|---|---|
| EP | 0431956 A2 | 7/1990 |
| EP | 0874248 A2 | 10/1998 |
| EP | 0936758 A2 | 8/1999 |
| EP | 0 982 964 B1 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 B | 7/2004 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | 95/35636 | 12/1995 |
| WO | WO 97/11384 | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 | 3/2000 |
| WO | WO 00/28755 A1 | 5/2000 |
| WO | WO 0049826 | 8/2000 |
| WO | WO 0049827 | 8/2000 |
| WO | WO 01/03372 | 1/2001 |
| WO | WO 01/37601 | 5/2001 |
| WO | WO 01/99082 A2 | 12/2001 |
| WO | WO 02/47421 | 12/2001 |
| WO | WO 0195592 | 12/2001 |
| WO | WO 02/073997 A1 | 9/2002 |
| WO | WO 02/082850 | 10/2002 |

| | | |
|---|---|---|
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 A1 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

Supplementary European Search Report of EP 06 70 5017 dated Feb. 9, 2009.
M. Hata, "Empirical formula for propagation loss in land mobile radio services" IEEE Transactions on Vehicular Technology, vol. VT-29, pp. 317-325, Aug. 1980.
T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.
3rd Generation Partnership Program, "3GPP TR 25.942 Radio Frequency (RF) System Scenarios," tech. rep., 3GPP, 2004.
Schwartz et al., "On the Distribution and Moments of Power Sums with Logonormal Components", Bell Sys. Tech, J., vol. 61, No. 7, pp. 1441-1463.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
W.C.Y. Lee, Mobile Communications Engineering. McGraw-Hill, 1982.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
C.R. Drane, Positioning Systems—A Unified Approach, Lecture Notes in Control and Infromation Sciences, Springer Verlag, Oct. 1992.
P.L.H.A.S. Fischer, "Evaluation of Positioning Measurement Systems," T1P1.5/97-110, Dec. 1997.
A.M. Zoubir and B. Boobash, "The Bootstrap and Its Application in Signal Processing," IEEE Signal Processing Magazine, 15(1):56-76, Jan. 1998.
Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.
Section 2.7 of Mobile Radio Communications 2nd Ed. Steele and Hanzo, IBSN 047197806X,J. Wiley & Sons Ltd., 1999.
B. Matsumori T1P1.5/98-600 "Radio Camera System and Location Fingerprinting Technology", Presentation Submission to Location Standards Working Group T1P1.5 by U.S. Wireless 1998.
Annex I of GSM 05.05 "Digital cellular Telecommunication System (Phase 2)", Radio Transmission and Reception, 2001.
S.R. Saunders & A. Aragon-Zavala, Antennas and Propagation for Wireless Communications Systems: 2nd Ed., Wiley 2007.
Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.
Specification 3GPP TS 31.111-Sections 6.4, 6.616, 6.6.21 and 6.6. 22.
"Computational Geometry in C (Cambridge Tracts in Theoretical Computer Science)", Joseph O'Rourke, Cambridge University Press; 2000 edition, ISBN 0521649765.
European Search Report dated Nov. 4, 2010 for EP 08714391.3.
International Search Report dated Sep. 20, 2004 for PCT/AU2004/000983.
European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
3GPP-TR-23.806, "Voice Call Continuity Between CA and MS Study", tech. rep. 3GPP, 2005.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
OMA Download Architecture-Version 1.0, Jun. 25, 2004.
Mir et. al, "A Zone-Based Location Service for Mobile Ad Hoc Networks", 1NCC 2004, Jun. 2004.
3GPP TR05.08, "Radio Subsystem Link Control", Nov. 2005.

Specification 3GPP TS 03.22, "Radio Access Network; Functions Related to Mobile Station(MS) in Idle Mode and Group Receive Mode", 1999.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
International Search Report of PCT/AU2006/001577 dated Nov. 28, 2006.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.

* cited by examiner

ENHANCED MOBILE LOCATION METHOD AND SYSTEM

CROSS REFERENCE TO RELATED APPLICATION

This application is the National Phase application of International Application No. PCT/AU2006/000347, filed 20 Mar. 2006, which claims priority to Australian Application No. 2005901353, filed 18 Mar. 2005. Each of these applications, in its entirety, is incorporated herein by reference.

TECHNICAL FIELD

This invention relates to methods and apparatus for locating a mobile radio terminal within a radio communications network.

BACKGROUND TO THE INVENTION

This application claims priority from Australian Provisional Patent Application No. 2005901353, the entire content of which is hereby incorporated by reference.

The most commonly deployed mobile location systems at present are cell ID and enhanced cell ID systems. These systems use existing measurements within the mobile network. As a result they are able to locate existing handsets without requiring the modifications typically required by higher accuracy techniques.

Cell ID only systems typically use the association between a mobile and its serving cell and return a corresponding position fix. In some cases this position may simply be the coordinates of the base station. In the case of sectored sites, a better solution is usually the notional centroid of the coverage area of that cell.

Enhanced cell ID systems add further information to the serving cell identity to achieve better performance. The most common piece of information is a round trip delay measurement between the serving cell and the mobile. Using the GSM network as an example, the Timing Advance (TA) is measured by the base station and represents the round trip delay from the base station to the mobile and back again. It is encoded with a resolution of one bit and therefore provides a one way range measurement with a resolution of half a bit or approximately 550 meters. The use of a TA based range constraint enables a significant accuracy improvement over a CID only solution. The actual degree of improvement depends on several factors but is typically a factor of two to three times.

A further source of information used by some enhanced cell ID systems is signal levels measured either by the handset or the network. For instance in some networks, each cell broadcasts a beacon channel to aid handsets in selecting the optimal point through which to access the network. Handsets measure the beacon signal power received from the neighbouring cells. If the transmit power of these beacon channels is known then the power received at the mobile reflects, to some degree, the range between base station and mobile. Other factors such as antenna radiation pattern and fading in the radio channel also affect the power received. In a system already using serving cell identity and round trip time, the additional use of signal level measurements provides a moderate level of improvement. Typical improvement factors range between 1.2 and 2.0 times.

It is an object of the present invention to provide a further or alternative method and system for improving the location of a mobile radio terminal within a radio communications network.

SUMMARY OF THE INVENTION

According to one aspect of the present invention, there is provided a method for locating a mobile radio terminal in a radio communications network, the method comprising:
 identifying a set of cells about an approximated location of the mobile radio terminal;
 identifying at least one cell in the identified set that is unreported by the mobile radio terminal, the remaining cells in the identified set being reported; and
 determining a location of the mobile radio terminal on the basis of the at least one unreported cell.

In one form, the method further comprises determining a likely reason for that at least one unreported cell being unreported.

In another form, the method further comprises seeking a network list containing a list of cells that the mobile radio terminal should detect.

In a further aspect, in the event that the network list is not available, the method further comprises assuming that the mobile radio terminal detected the at least one unreported cell.

In a further aspect, in the even that the network list is available and the at least one unreported cell is not on the network list, the method further comprises removing the at least one unreported cell from further consideration.

In another aspect, the method further comprises determining whether the at least one unreported cell is operational.

In a further aspect, if the at least one unreported cell is determined to be not operational, the method further comprises removing the at least one unreported cell from further consideration.

In a further aspect, if the number of identified cells exceeds a maximum reporting threshold, the method further comprises assuming that the at least one unreported cell was detected by the mobile radio terminal and assigning an upper signal strength value for the at least one unreported cell equal to that of the weakest signal strength of the reported cells.

In a further aspect, the method comprises determining whether any of the reported cells interfered with the at least one unreported cell.

In another aspect, if it is determined that a reported cell interfered with the at least one unreported cell, the method further comprises assigning an upper signal strength value to the at least one unreported cell equal to the signal strength of the interfering cell minus a system-specific buffer.

In one form, the system is a GSM system and the system-specific buffer is substantially 9 dB.

In another aspect, the method comprises assigning a minimum signal strength for the at least one unreported cell signal strength equal to that of a receiver sensitivity threshold of the mobile radio terminal.

In another aspect, the method further comprises using the assigned signal strength value for the at least one unreported cell in a position estimation model.

In a further aspect, the method further comprises determining a probability term associated with the at least one unreported cell.

In this aspect, the method further comprises incorporating the probability term in a combined probability function to obtain the location estimation of the mobile radio terminal.

According to a second aspect of the present invention, there is provided a system for locating a mobile radio terminal in a radio communications network, the system comprising:

means for identifying a set of cells about an approximated location of the mobile radio terminal;

means for identifying at least one cell in the set of identified cells that is unreported by the mobile radio terminal, the remaining cells in the identified set being reported; and means for determining a location of the mobile radio terminal on the basis of the at least one unreported cell.

In one aspect, the system further comprises means for determining a likely reason for the at least one unreported cell being unreported.

In another aspect, the system further comprises means for seeking a network list containing a list of cells that the mobile radio terminal should detect.

In another aspect, the system further comprises means for determining whether the at least one unreported cell is operational.

In another form the system further comprises means for assigning an upper signal strength for the at least one unreported cell equal to that of the weakest signal strength of the reported cells if the number of identified cells exceeds a maximum reporting threshold.

In a further form, the system further comprises means for determining whether any of the reported cells interfered with the at least one unreported cell.

In another aspect, the system further comprises means for assigning an upper signal strength value to the at least one unreported cell equal to the signal strength of the interfering cell minus a system-specific buffer, if it is determined that a reported cell interfered with the at least one unreported cell.

In one form, the system is a GSM system and the system-specific buffer is substantially 9 dB.

In a further aspect, the system comprises means for assigning a minimum signal strength for the at least one unreported cell signal strength equal to that of a receiver sensitivity threshold of the mobile radio terminal.

In a further aspect, the system comprises means for calculating the location of the mobile radio terminal using the assigned signal level for the at least one unreported cell in a position estimation model.

In another aspect, the system comprises means for determining a probability term associated with the at least one unreported cell.

In another aspect, the system comprises means for incorporating the probability term in a combined probability function to obtain the location estimation of the mobile radio terminal.

According to a further aspect of the present invention, there is provided a machine readable medium containing instructions to cause a machine to perform the method of any one of the preceding forms or aspects.

BRIEF DESCRIPTION OF THE DRAWINGS

Different aspects of the present invention will now be described in detail with reference to the following drawings in which.

DETAILED DESCRIPTION

The present invention will now be described in detail with reference to one or more embodiments of the invention, examples of which are illustrated in the accompanying drawings. The examples and embodiments are provided by way of explanation only and are not to be taken as limiting to the scope of the invention. Furthermore, features illustrated or described as part of one embodiment may be used with one or more other embodiments to provide a further new combination.

It will be understood that the present invention will cover these variations and embodiments as well as variations and modifications that would be understood by the person skilled in the art.

One framework for computing an enhanced cell ID solution incorporating round trip delay and signal level measurements is to use a standard estimation technique to evaluate a probability or likelihood function over some region of interest and choose the most likely position as the estimate of the mobile radio terminal's, or "mobile's" location. The likelihood function may also be in the form of a cost function, with the point of minimum cost selected as the best solution. This selection process may be accomplished either by evaluating the function over a set of discrete points from a grid or alternatively by a solver that iteratively moves towards the solution.

The present invention provides an additional source of positional information which when incorporated into such a position calculation framework enables greater accuracy. In one aspect, the present invention uses a cost function evaluated over the region of interest. The point at which the cost function is minimised (or conversely maximised depending upon how the cost function is defined) defines the best estimate of the position. One form of cost function that may be used is based on the probability $p(\vec{o}|\vec{x})$ where $\vec{x}$ is a two dimensional vector representing a possible mobile position or location and $\vec{o}$ is a vector of observations which may include one or more serving cell identities, and/or one or more round trip times and/or one or more signal levels. Techniques well known in the art such as Maximum Likelihood are then used to find the best position estimate taking into account the probability function $p(\vec{o}|\vec{x})$ and the statistical distribution of the errors associated with each observation.

In a cellular radio network the mobile has a choice of which cells it measures and of those, which subset it will report. Information relating to the cells that a mobile reports can be used in estimating the position of the mobile. This is used in Cell ID based location systems. Estimates of the location of mobiles in a radio communications network may be obtained in Cell ID based systems using one or more techniques including:

- equating the location of the mobile to that of the serving cell.
- averaging the locations of all reported cells
- weighting the average of the locations of all reported cells where the weighting factors can include chosen according to one or more of a number of possibilities, including:
  - Serving cell has a weighting of 2 and other cells a weighting of 1
  - Making the weighting proportional to the received signal level of a particular cell
- using the averaging techniques as above but using the geometric centroid of the cells' nominal footprint for cells with directional antennas According to an aspect of the present invention, the cells that are not reported can also reveal position or location information. In one form, this information can provide information relating to where the mobile is not located. In another form, determining that subset of the unreported cells that may have been heard but were not heard or not reported given the list of cells that were reported may provide an indication of the mobile's position. Whether the lack of a report for a given cell provides any information is dependent upon the reason it was not reported.

Reasons for Unreported Cells

The reasons a given cell may not be reported include:

Cell not Measured

The mobile did not attempt to detect the signal from this cell. The cells a mobile attempts to listen to are determined by instructions provided by the network via the serving cell. For example, in GSM for instance this is called the BCCH Allocation (BA) list. In UMTS this could occur because the User Equipment (UE) has not received a matching physical layer measurement command. If a given neighbour cell is not included in the instructions, then it will not be measured and hence not reported.

Too Many Cells to Report

There is typically a limit or reporting cell threshold to the number of signals the mobile is required to measure and report. When there are more candidate neighbour cells than can be reported it is usually the highest N, when ordered by received signal level that are reported. If the signal level for a given neighbour cell is not one of the highest N, then is will be excluded from the report. For example, in GSM, the limit in the Network Measurement Report is 6 neighbours.

Cell is Blocked by Interference

In networks such as GSM and UMTS, the received signal level may not be reported if the signal cannot be decoded. If the received signal is too weak relative to the interference from other cells in the network then the presence of the signal may not be detected and if detected may not be decodeable.

Cell Signal is Below Receiver Sensitivity Threshold

The received signal level is too weak and the receiver noise floor prevents its detection.

Cell is not Operating

There is no signal to measure.

Optimising Unreported Cell Analysis

The number of unreported cells will, in a typical network, out-number the reported cells by several orders of magnitude. The vast majority of these unreported cells will not reveal any position information as they are sufficiently far enough away from the serving cell that it is obvious or expected that they would not be heard. Hence to optimise any computation associated with the analysis of unreported cells, there is an optional first step to determine those unreported cells for which it is clear that they will not convey any location information.

Excluding unreported cells that are more than a specified distance away from a position estimate is one technique. The position estimate can be derived from any or a combination of techniques well known in the art including Cell ID solution, Cell ID plus round trip time, signal strength based estimate, angle of arrival, time of arrival, time-difference of arrival, or other methods including that disclosed in co-pending PCT patent application no. PCT/AU2005/001358 entitled "Radio Mobile Unit Location System", the entire contents of which are herein incorporated by reference and co-pending PCT patent application entitled "Enhanced Mobile Location", the entire contents of which is hereby incorporated by reference, and claiming priority from Australian provisional patent application no. 2005901352.

The specified distance could be the maximum useable range of the system, for example 35 km in GSM, proportional to the cell radius in the network near the estimate position, a pre-defined range specified per serving cell, or a value used across the entire network.

Another mechanism is to provide a list of cells that may be heard based on criteria that can be identified from the reports made by the mobile. The list could be generated by inspection of the radio network plan, by using network planning tools or by simulation or a combination of these techniques. In one form, a criterion may be the serving cell. In this case each cell is assigned a list of cells that may be heard by mobiles when using that cell as the serving cell. In another form, the criteria may be to use a position estimate of the mobile. The network is divided into a number of regions and for each region, a list of potentially detectable cells is generated.

At the end of this process there will be a list of cells. The list will contain all of the reported cells and a subset of the unreported cells.

Figure 1:
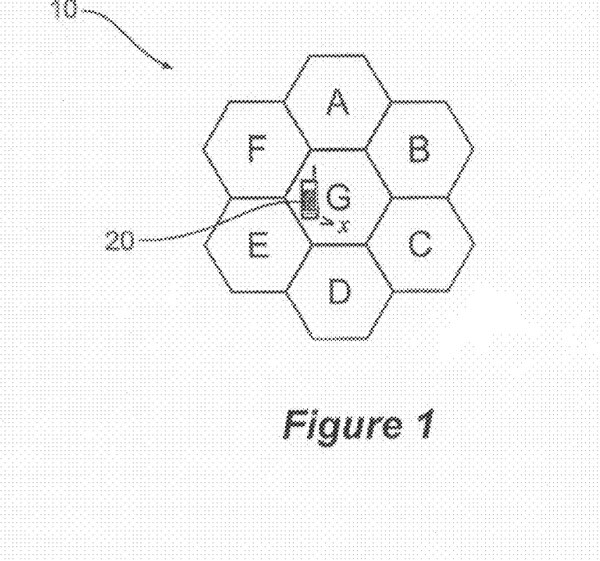
FIG. 1—shows a set of cells involved in one aspect of the present invention.

FIG. 1 shows a part of a radio communications network 10, including cells A, B, C, D, E and F, surrounding cell G. The approximate position $\hat{x}$ of the mobile radio terminal, or mobile 20, is determined to be in cell G. Network 10 could be a GSM, UMTS, CDMA, CDMA 2000 network or any other cellular wireless communications network.

Figure 2:
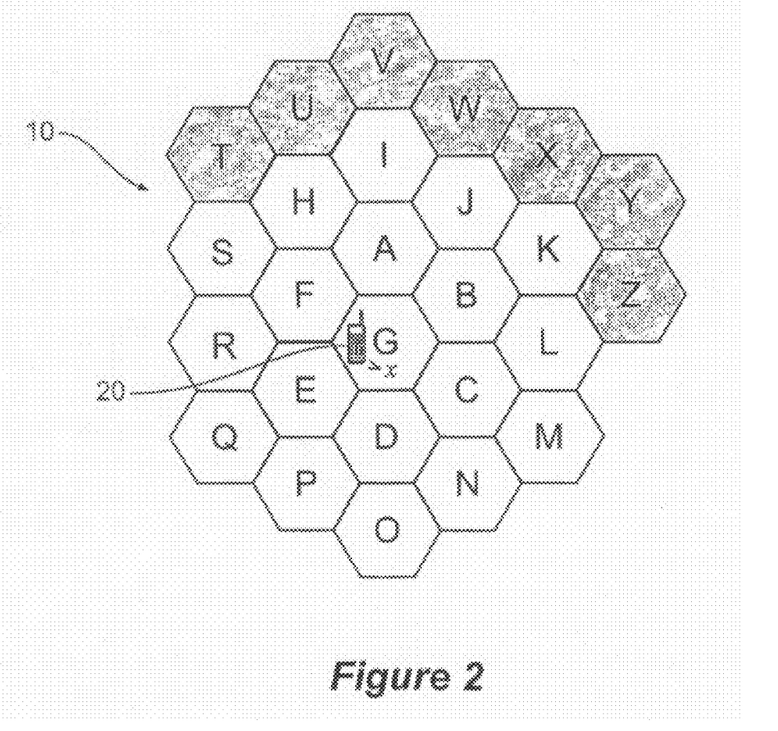
FIG. 2—shows a different arrangement of cells involved in another aspect of the present invention.
Figure 3:
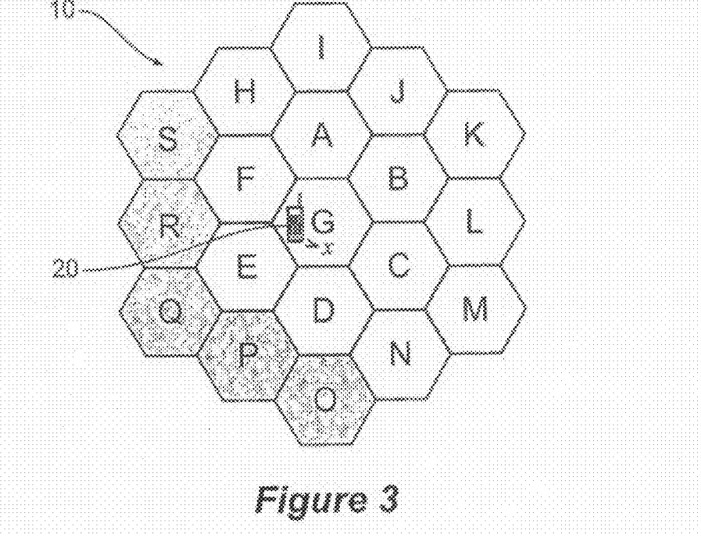
FIG. 3—shows the set of cells shown in FIG. 2 after having eliminated cells beyond a maximum distance threshold.

FIG. 2 shows a different arrangement of cells in network 10. Here shown are cells 26 A to Z in network 10, including cell G, in which mobile 20 is estimated to be in, at position x. As shown in FIG. 2, cells T to Z (shaded) are to be excluded from consideration because they are beyond the specified distance from the position estimate of mobile 20, as discussed above in relation to one aspect of the invention. This then leaves cells A to S which may be considered, as shown in FIG. 3.

Unreported Cell Analysis

The next step is to determine the reason for a cell not being reported. Each cell is analysed against each of the reasons. The analysis can be performed in any order. However it is preferable to perform the tests in the order listed as the results of some tests alleviate the need for further tests and thus the total number of tests that have to be performed can be reduced.

The analysis conducted according to this aspect of the present invention serves two purposes. Firstly, some of the unreported cells may be removed from further analysis. Secondly, for the remaining unreported cells, an estimate of the maximum possible signal strength is made.

Cell not Measured

This reason can occur relatively commonly. In the event that the mobile network model includes a network list having information on the measurements to be attempted by the mobile (for instance the BCCH Allocation (BA) list in GSM), the unreported cells are processed, removing any cells which would not have been attempted to be reported by the mobile 20. This is because the absence of this cell merely reflects a network planning decision, and does not convey any information concerning the physical location of the mobile 30. In the event that the measurement information is not available, this step is omitted.

FIG. 3 shows an arrangement of cells in network 10, which are within the maximum range set (if this method is used) as described above with reference to FIG. 2. In this arrangement, cells A to S are available for consideration.

In the case where a network list is available as described above, this list may indicate that cells A to N are to be reported. Cells O to S (shaded) may then be disregarded according to this aspect of the invention.

Operation when No Information on the Measurement Attempts is Available

In the event that the control imposed on the mobile regarding which channels to measure is not available, it is not possible to determine if an unreported cell was not reported because the mobile was not instructed to listen to that cell or that the mobile 26 could not detect that cell.

In such cases, one aspect of the invention is to assume that an attempt was made to measure the cell and to choose one of the remaining reasons from which to derive a positional constraint. Simulations and experiments have shown that there is very minor loss of performance in this case as in well designed networks those cells for which the mobile is not given instruction are cells that are not expected to be heard. Consequently the impact on performance is minimal. The other reason is that in some networks the instruction sent to the mobile is to attempt to listen to all available channels and hence in such networks the assumption that an attempt was made to measure the cell is valid Cell is not Operating If a cell is not operating then it cannot be reported. The lack of a report conveys no information concerning position and hence the cell is removed from the list of unreported cells.

A cell may not be operational because it or its supporting infrastructure has failed, it being maintained or upgraded, etc. Network operators are aware of those cells that are not operational and hence can make that information available for use in this invention.

Another mechanism for detecting cells that are not operating is to maintain a history of when each cell has been reported. This history can be queried to determine whether a given cell is currently operational or not.

Figure 4:
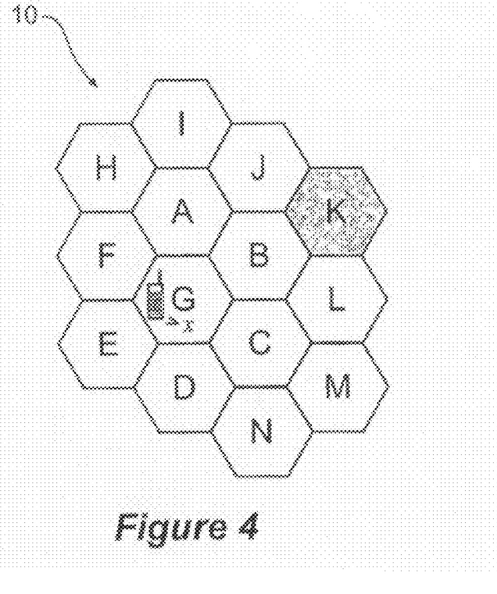
FIG. 4—shows the set of cells shown in FIG. 3 after having eliminated those cells not included in a network list.

FIG. 4 shows the arrangement of cells that is intended to be considered, however, in this example, cell K (shaded) is not operating, and therefore cannot be detected by mobile 20. According to this aspect of the present invention, cell K may be eliminated from further consideration.

Too Many Cells to Report

This case applies if the mobile 20 has reported the maximum number of neighbours possible, as determined by the reporting cell threshold. This can occur relatively often in dense areas where the number of detected neighbouring cells is large. If his is determined to be the reason for the cell not being reported, it may be inferred that the signal from the unreported cell may have been received sufficiently strongly to be detected but was weaker than all of those reported. In one aspect of the invention then, this unreported cell is assigned an upper signal strength equal to that of the weakest measurement that was reported.

Figure 5:
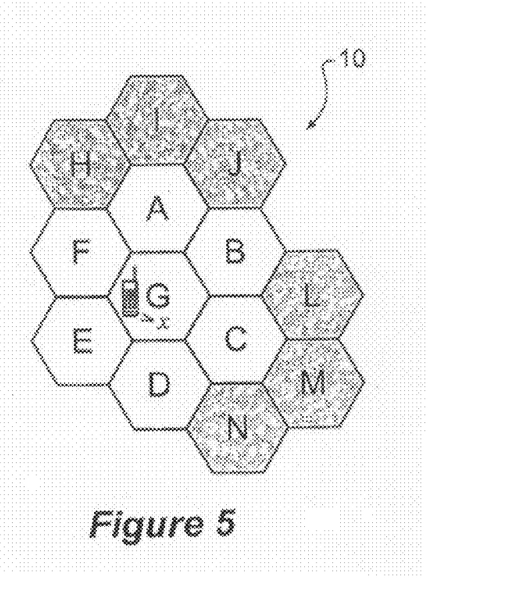
FIG. 5—shows the set of cells of FIG. 4 after eliminating those cells not operating.

FIG. 5 shows the example situation where the network 10 is a GSM network and the upper limit to the Network Measurement Report is 6 neighbours as described above.

In this case, this limits the report to cells A to F. Accordingly, cells H, I, J, L, M and N (shaded) are assigned an upper signal strength equal to that of the weakest measurement that was reported, in accordance with this aspect of the present invention.

Cell is Blocked by Co-Channel Interference.

For systems where frequencies are used by more than one transmitter, for example in GSM, a signal from a cell can suffer interference from a cell using the same channel, referred to as co-channel interference, or from cells using neighbouring channels, referred to as adjacent channel interference. For each unreported cell, the list of reported cells can be examined to determine if one or more of them contributed interference to the channel used by the unreported cell.

In the case of co-channel interference an unreported cell is using frequency channel $\partial$ and one of the reported cells used frequency channel $\partial$. The reported signal strength on frequency $\partial$ places an upper limit on the unreported cell's signal strength less a system-specific buffer. In the case of GSM the unreported cell must be at least 9 dB weaker than the reported cell. If it were any higher then, according to the GSM standard, the mobile would not be expected to have detected the cell. Thus for GSM an unreported cell suffering co-channel interference has an upper signal strength limit equal to that of it's co-channel interferer less 9 dB. For other FDMA systems there are similar specifications.

Mutual Blocking

The above analysis does not consider the effects of multiple interferers or the case where two or more cells on the same frequency are blocking each other. There is a small probability of two neighbouring cells blocking each other. In GSM in particular, if two cells using the same frequency channel are received within power levels 9 dB of each other, the mobile will not be able to detect either. The problem can be resolved by scanning the unreported cell list for co-channel interferers and using a radio propagation model to determine if the signals could mutually block each other. If such blocking is found and there was no other reason for the cell not being reported, the cells would be removed from the unreported cells list. In one form of the invention, the issue of mutual blocking may be disregarded. In well-designed FDMA (eg GSM) networks the problem is very unlikely to occur. In CDMA networks (eg UMTS) this does not occur because the processing gain associated with the de-spreading is sufficient to enable the signal to be detected and decoded.

Cell is Blocked by Adjacent or Alternate Channel Interference.

In systems where more than one frequency channel is used, interference can come from other frequency channels. In the case of adjacent channel interference an unreported cell is using frequency $\partial$ and one or more of the reported cells is using frequency channel $\partial+/-1$. In the case of alternate channel interference an unreported cell is using frequency channel $\partial$ and one or more of the reported cells is using frequency channel $\partial+/-2$.

Signals on a given channel can "leak" into the adjacent and alternate frequencies, the amount of leakage being specified by the particular standard in use. For an adjacent channel interferer to result in a channel not being detected it must be a certain level greater than the signal of interest. Thus for GSM an unreported cell suffering adjacent-channel interference has an upper signal strength limit equal to that of its adjacent-channel interferer less 9 dB. Similarly the figure for alternate channel interference is 41 dB. For other communications systems there are similar values available.

Approximating Multiple Combined Interferers by the Strongest

The analysis of co-channel and adjacent/alternate channel interference above is based on there being a single interferer that is the sole reason for a cell not being detected. It is possible that more than one interferer could combine to this effect. For example, in GSM, two reported cells might use the frequencies immediately above and below that of the unreported cell of interest. In this case the adjacent channel leakage from both channels would combine, in the worst case resulting in an interference level greater than that due to either one alone. The resolution of this issue is to use more sophisticated models of interference, well known in the art, to determine a more accurate maximum signal threshold. One implementation is to specify the interference threshold based on the interferer that causes the most interference on the unreported cell. Doing so limits the computational complexity and given the relatively large uncertainty represented by the signal fading is likely to have negligible effect.

Cell Signal is Below Receiver Sensitivity Threshold

The mobile is limited in its ability to detect signals. Signals that are weaker than the receiver sensitivity threshold of mobile 20 cannot be detected. Based on this reason, the maximum possible signal level for an unreported cell is set to the receiver sensitivity threshold as the signal must be weaker than this threshold.

Determine the Maximum Signal Possible Signal Level

This step is to assign a maximum possible signal level based on the analysis of the reasons for a cell not being reported. This is the best conservative estimate as to the maximum level that a given cell could have been measured without being reported given the set of cells that were reported.

This step is only applied to those unreported cells that were not removed by the optional editing process, or based on the cell not being measured or based on the cell not being operational. Such cells are deemed not to provide any useful location information and are optionally not included in this or any further steps.

In the event of an unreported cell having a co-channel interferer in the list of reported cells, then the signal threshold is that specified based on the signal level of the co-channel interferer that was reported. The fact that a signal was detected on this channel implies that adjacent and alternate channel interference are not a factor. Whether an upper limit has been set based on a full report is not relevant as the co-channel interferer is the factor that has blocked the reporting of the cell.

Where adjacent and alternate channel interference has been detected, that is the reported cell list contains one or more measurements from channels up to 2 channels away from the unreported cell's channel, then the maximum possible signal level is the signal level derived due to the influence of the interferers or the signal level of the weakest cell when the reported cell list is full, which ever is greater. If the number of cells reported is not at the maximum, then the maximum signal level is set to be that due to the influence of the interferers.

Where there was no interference, the maximum possible signal level is that assigned based on the receiver detection threshold.

The final check is to ensure that all maximum possible detection thresholds are greater than the receiver detection threshold. Any cells which have been assigned a maximum possible signal level lower than this threshold are assigned a level equal to the receiver detection threshold.

Incorporation of Unreported Cell Signal Strength for Position Estimation

Each of the unreported cells has now been assigned a maximum possible signal strength. This metric can be incorporated into various position estimation methods, including the methods described in the co-pending PCT patent application referred to above entitled "Enhanced Mobile Location".

Locus Generation

A common location estimation process is to convert observations to a locus and an associated uncertainty. The observation could be converted into the most likely signal level by calculating the most likely signal level, rather than the highest possible. The means for doing so will be clear to one skilled in the art based on the earlier descriptions.

Disclose Cell ID Based Weighting

In a Cell ID system where the cells are weighted by signal strength, the unreported cells could be given a negative weight in proportion to the maximum or mean predicted signal level. This would have the effect of pushing the estimated position away from those cells that were not heard.

Cost-Function Based Estimation.

Cost-based estimation requires the system to be modelled such that the difference between the observations and the model taking into account the errors in the observation process are used to evaluate the predictions at a given point with the observations. Cost metrics well known in the art include probability, likelihood, and log-likelihood.

PRACTICLE EXAMPLE

One implementation is to use a cost function mechanism based on probability, an approach well known in the art.

For a point located within a radio network, it is possible to predict the received signal level at the point based on a given radio network plan using techniques well known in the art. For every possible point in the network it is possible to estimate the received signal strength for every signal in the network.

This can be applied to a set of signal level measurements made by a mobile and the maximum possible signal levels that have been determined for the subset of unreported cells deemed relevant. The aim of cost-function based approaches is to find the point x at which the observations best match the system model. One possible cost function is probability. For an unreported cell, the observation is the assigned maximum possible signal level denoted $L_m$. The corresponding model is a predicted received signal level. At a given point x the mean predicted signal level for a given unreported cell is $L_p$. The probability that the given cell was not reported at x is denoted $p(L_p<L_m|x)$. The actual value this probability takes on is dependent on the statistical distribution used to model the variations in received signal strength. For a Gaussian distribution the probability is:

$$p(L_p < L_m \mid x) = 0.5 * \left[1 + \mathrm{erf}\left(\frac{L_m - L_p(x)}{\sqrt{2} * \sigma_{SF}}\right)\right] \quad (1)$$

Where $\sigma_{SF}$ is the standard deviation due to slow fading, and erf( ) is the error function.

The combined probability of the unreported cells at a given point x, denoted p(u|x) is the product of the conditional probabilities for each of the unreported cells:

$$p(u \mid x) = \prod_i^D p(L_{pi} < L_{mi} \mid x) \quad (2)$$

Where D is the number of unreported cells and i is the index into the list of relevant unreported cells.

The same process applies for integrating other sources of position information that have been framed in a probabilistic framework. Given a set of observations o and a probabilistic model that enable the probability p(o|x) to be calculated, the combined effect of o and u is simply the product of the conditional probabilities:

$$p(o'|x)=p(o|x)*p(u|x) \quad (3)$$

where o' is the combined set of observations (unreported cells and other observations). The observations and corresponding models that contribute to o and p(o|x) are well known in the art and include but are not limited to, the signal strengths of the reported cells, time of arrival measurements, time difference of arrival measurements and angle of arrival measurements.

The position estimate is derived by finding the value of x that maximises the overall probability function. There are many algorithms well known in the art for providing this estimate given the probabilities as a function of x. The techniques can be continuous, using algebraic representations, or discrete, evaluating the probabilities at each point over a grid.

Figure 6:
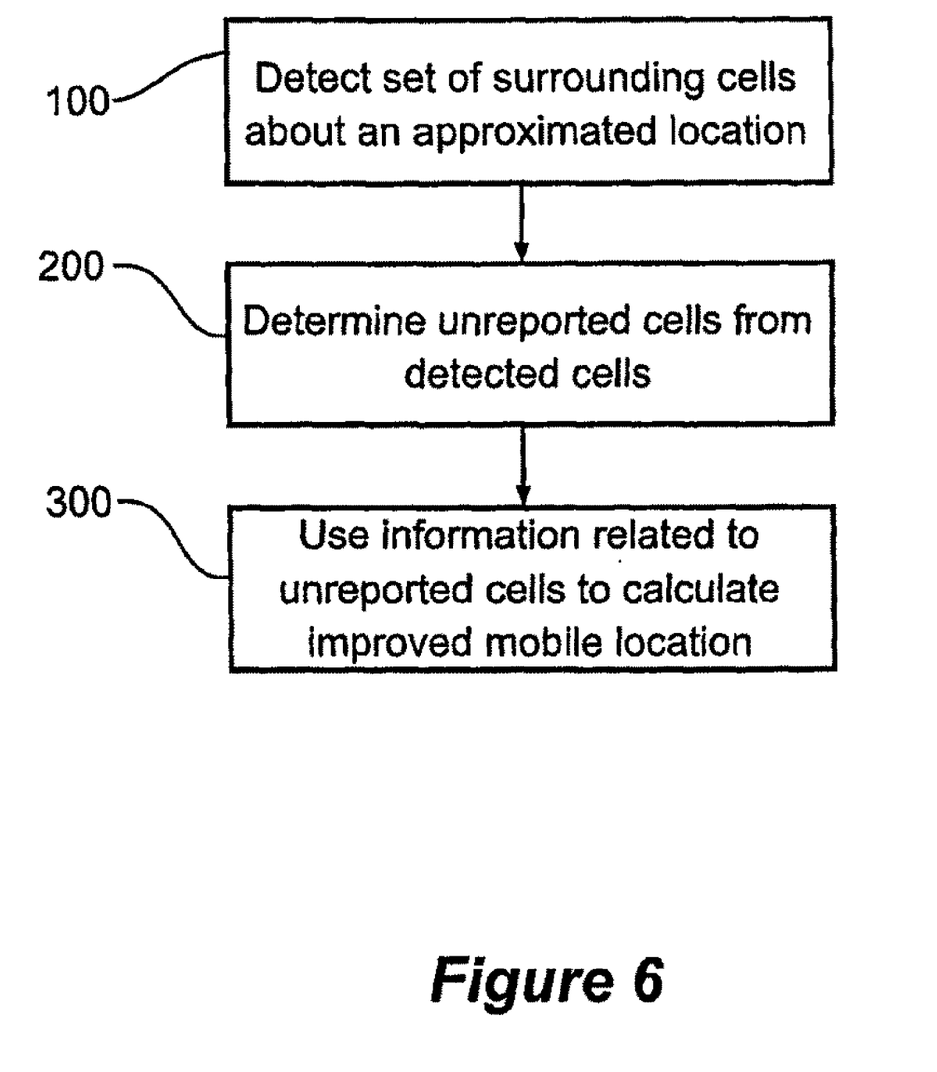
FIG. 6—shows a process flow of one broad aspect of the present invention.

In a general form, the method according to one aspect of the invention is shown in FIG. 6. In the first step 100, the mobile 20 detects a set of surrounding cells about an estimated location x. From this set of detected cells, some may be unreported as described above. In step 200, the method determines which of the detected cells are unreported. In step 300, information related to the unreported cell is then used to calculate an improved location estimate for mobile 20 (as discussed above).

Figure 7:
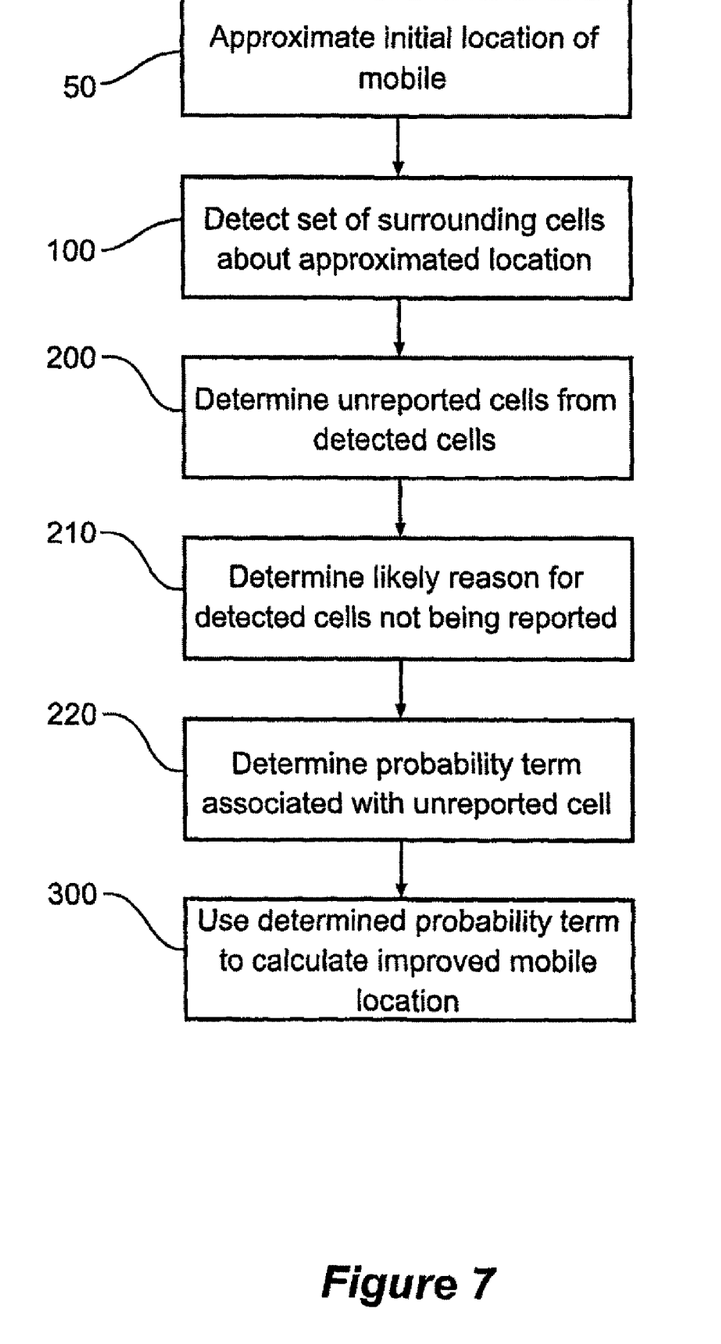
FIG. 7—shows a process flow of another aspect of the present invention.

In one form of the invention, and as shown in FIG. 7, the method described in relation to FIG. 6 may include the additional steps of determining or otherwise obtaining (for example by external location means such as GPS), an initial estimate of the location of mobile 20 in the radio communications network 10. This is shown in step 50. Many possible methods of determining or otherwise obtaining this estimate are described elsewhere in this description. In step 100, the mobile 20 detects a set of surrounding cells about the estimated location. From this set of detected cells, some may be unreported as described above. In step 200, the method determines which of the detected cells are unreported. In step 210, the method determines a likely reason for the cells being unreported as described in detail above. In step 220, a probability term is associated with the unreported cell as will be described in more detail below. In step 300 then, this probability term is used to determine an improved location estimate of mobile 20, again as discussed above.

It will be understood that the above methods can be used in relation to a single unreported cell, or a plurality of unreported cells.

Figure 8:
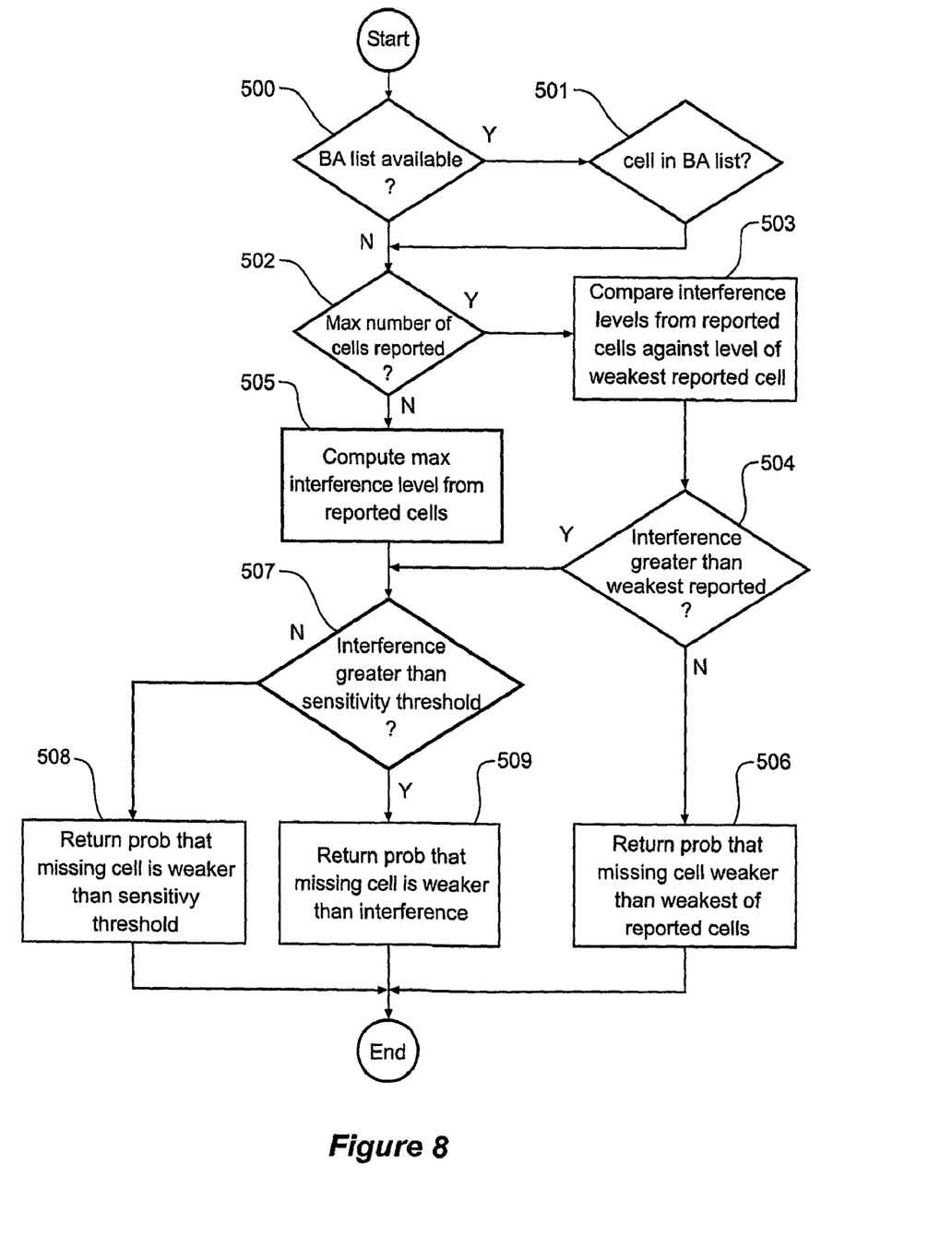
FIG. 8—shows a process flow for determining the most probable cause for a neighbouring cell having not been reported.

In FIG. 8, an exemplary method is shown incorporating some of the aspects of the invention described above. It will be appreciated that any one or more of the aspects could be used to provide an improved location estimate.

In step 500, the method checks to see if a BA list (in the case of a GSM system) is available to determine whether there is information available as to which cells were or were not required to be detected by mobile 20. If there is a BA list available, the method then checks (501) to see if the unreported cell was in the BA list. If the cell is not in the BA list, then that cell may be discounted from further consideration. If the cell is in the BA list, the method proceeds to step 502. The method will also proceed directly to step 502 in the event that there is no BA list available.

In step 502, the method checks a network threshold to determine the maximum number of cells that can be reported. If the number of cells reported exceeds this maximum number, the method compares the interference levels from the reported cells against the level of the signal strength of the weakest reported cell in step 503.

In step 504, the method checks to see if the interference level is greater than the weakest signal strength of the weakest reported cell. If not, then the method proceeds to step 506 to determine the probability that the unreported cell is weaker than the weakest of the reported cells.

If in step 502 above, it is determined that the maximum number of cells has not been reported, then the method proceeds to step 505 to compute the maximum interference level from the reported cells. In step 507, the method checks to see whether the interference level is greater than the sensitivity threshold of mobile 20. If so, then the probability of the unreported cell being weaker than the interference level is determined in step 509. If not, then the method proceeds to step 508 to determine the probability that the unreported cell is weaker than the mobile 20 sensitivity threshold.

In the system used in the mobile radio communications network, the calculations and steps performed according to the present invention may be performed by a number of elements. In one form, the measurement made by the mobile 20 may be transmitted to a server within or external to the network 10, or other processing elements. In this form, the server or other processing element(s) could perform some or all of the processing and then return the results of the processing to one or more parts of the network 10, or externally to the network 10, and/or to the mobile 20 itself. In another form, the system could distribute some of the calculations over a number of different elements in the network, including servers and mobile itself, as well as elements external to the network 10, and transmit parts of calculated or measured data to different elements, including the mobile 20 itself. In yet a further form, the mobile 20, given sufficient memory and processing power, could perform all of the steps of the present invention. The mobile 20 could also make use of the improved location estimates itself to perform further calculations, or could provide the improved location estimates to a user, by video, audio or other means.

It will also be appreciated then that the software for performing the above calculations could therefore be hosted by a number of different machine readable mediums, whether it be an element of the network 10 such as in serving cell 30, a memory of the mobile 20 itself, on a Subscriber Identity Module (SIM) card of the mobile, or distributed among different elements.

The preceding description frequently uses the GSM system to illustrate the operation of the invention. This is not a limitation of the method however. For example, in the case of UMTS the mobile may be tasked to measure and report intra-frequency cells as well as specific inter-frequency cells. The absence of particular cells in the approximate vicinity of the mobile can be used with this approach for enhanced cell ID positioning. It will be understood that system specific characteristics such as adjacent channel rejection factors and mobile sensitivity thresholds have to be set appropriately for the system under consideration. In general the method can be applied to any communication system that uses multiple transmitters.

The description above also shows the use of information concerning non reported cells for enhanced location accuracy. The description shows the application of this information in the form of a probability term, combined with other probability terms in a composite probability term representing the probability of a mobile being situated at a given location given a set of signal parameter measurements.

This particular form is used as one example only and should not be construed as the only form in which the additional information can be applied.

For example, the information could be applied in the form of a likelihood or a log likelihood term. It could for instance be combined with other log likelihood terms in a cost function for which the minimum is sought. It will also be appreciated that where signal levels are assigned to certain cells, this assignment may be done only for the purposes of considering the unreported cells and need not be applied across the whole network for other considerations.

The present invention provides an additional source of information to constrain the likely position of the mobile in an enhanced cell ID location system. It is particularly useful in systems already employing signal level measurements from neighbouring cells, although need not be confined to such. When added to round trip delay and signal level based methods this provides a useful improvement Trials reveal an approx 10% improvement when using unreported cells. One set of trials showed that the 65%/95% accuracy statistics for a position estimation system based on signal strength improved from 959 m/2521 m to 835 m/2265 m—an improvement of approximately 10%.

The enhanced location measurements obtained by the present invention may be useful in many applications, including, but not limited to:

Self navigation (for example as an alternative to GPS systems); Location Based Services (LBS) in which a telecommunications service provider can tailor communication and other services depending upon the subscriber's location at any one time; emergency/rescue location services; tracking of individual persons, for example to alert a parent that her child carrying a mobile phone has traveled outside of a "safety zone" of a path between the child's home and the child's school; transport fleet management systems, and any other application where knowledge of the location of a mobile or a person associated with a mobile may be used.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

The invention claimed is:

1. A method for locating a mobile radio terminal in a radio communications network, the method comprising:
   identifying a set of cells about an approximated location of the mobile radio terminal;
   identifying at least one cell in the identified set that is unreported by the mobile radio terminal, the remaining cells in the identified set being reported;
   determining a maximum number of cells that can be reported by checking a network threshold;
   if the reported cells in the identified set exceed the maximum number of cells, compare interference levels from the reported cells against a level of signal strength of the weakest reported cell and determine a first probability that an unreported cell is weaker than the weakest of the reported cells;
   if the reported cells in the identified set do not exceed the maximum number of cells, compute a maximum interference level from the reported cells in the identified set and determine whether the maximum interference level is greater than a receiver sensitivity threshold of the mobile radio terminal;
   if the maximum interference level is greater than the sensitivity threshold, compute a second probability of the unreported cell being weaker than the maximum interference level;
   if the maximum interference level is not greater than the sensitivity threshold, compute a third probability that the unreported cell is weaker than the mobile radio terminal sensitivity threshold; and
   determining a location of the mobile radio terminal on the basis of at least one of the first probability, the second probability and the third probability.

2. The method as claimed in claim 1, further comprising seeking a network list containing a list of cells that the mobile radio terminal should detect.

3. The method as claimed in claim 2 wherein the network list is a BA list.

4. The method as claimed in claim 3 wherein in the event that the network list is available and the at least one unreported cell is not on the network list, removing the at least one unreported cell from further consideration.

5. A system for locating a mobile radio terminal in a radio communications network, the system comprising at least one processing element configured to:
   identify a set of cells about an approximate location of the mobile radio terminal;
   identify at least one cell in the set of identified cells that is unreported by the mobile radio terminal, the remaining cells in the identified set being reported; and
   determine a maximum number of cells that can be reported by checking a network threshold; wherein
   if the reported cells in the identified set exceed the maximum number of cells, the at least one processing element compares interference levels from the reported cells against a level of signal strength of the weakest reported cell and determines a first probability that an unreported cell is weaker than the weakest of the reported cells;
   if the reported cells in the identified set do not exceed the maximum number of cells, the at least one processing element computes a maximum interference level from the reported cells in the identified set and determines whether the maximum interference level is greater than a sensitivity threshold of the mobile radio terminal;
   if the maximum interference level is greater than the sensitivity threshold, the at least one processing element computes a second probability of the unreported cell being weaker than the maximum interference level; and
   if the maximum interference level is not greater than the sensitivity threshold, the at least one processing element computes a third probability that the unreported cell is weaker than the mobile radio terminal sensitivity threshold; wherein the at least one processing element is further configured to:
   determine a location of the mobile radio terminal on the basis of at least one of the first probability, the second probability and the third probability.

6. The system as claimed in claim 5, wherein the at least one processing element is further configured to seek a network list containing a list of cells that the mobile radio terminal should detect.

7. A non-transitory machine readable medium containing instructions to cause a machine to perform the method of any one of claims 1, 2, 3 and 4.

* * * * *

UNITED STATES PATENT AND TRADEMARK OFFICE
CERTIFICATE OF CORRECTION

PATENT NO. : 8,359,044 B2
APPLICATION NO. : 11/886528
DATED : January 22, 2013
INVENTOR(S) : MacNaughtan et al.

It is certified that error appears in the above-identified patent and that said Letters Patent is hereby corrected as shown below:

IN THE SPECIFICATION

At Column 7, line 25, after the word "the" and before the word "could" delete "mobile 26" and insert therefor --mobile 20--

At Column 7, line 61, after the word "If" and before the word "is" delete "his" and insert therefor --this--

At Column 10, line 24, before the word "EXAMPLE" delete "PRACTICLE" and insert therefor --PRACTICAL--

Signed and Sealed this
Seventh Day of May, 2013

Teresa Stanek Rea
*Acting Director of the United States Patent and Trademark Office*